US008282023B2

(12) United States Patent
Olander et al.

(10) Patent No.: US 8,282,023 B2
(45) Date of Patent: Oct. 9, 2012

(54) FLUID STORAGE AND DISPENSING SYSTEMS, AND FLUID SUPPLY PROCESSES COMPRISING SAME

(75) Inventors: W. Karl Olander, Indian Shores, FL (US); James V. McManus, Bethel, CT (US); Steven J. Hultquist, Chapel Hill, NC (US); Jose I. Arno, Brookfield, CT (US); Peter C. Van Buskirk, Newtown, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 13/149,666

(22) Filed: May 31, 2011

(65) Prior Publication Data

US 2011/0226874 A1 Sep. 22, 2011

Related U.S. Application Data

(63) Continuation of application No. 11/913,553, filed as application No. PCT/US2006/017149 on May 3, 2006, now Pat. No. 7,951,225.

(60) Provisional application No. 60/677,381, filed on May 3, 2005.

(51) Int. Cl.
*B01D 53/02* (2006.01)

(52) U.S. Cl. ................................ 239/418; 222/3; 206/7

(58) Field of Classification Search .................... 95/116, 95/131, 132, 143; 96/108; 206/0.7; 423/648.1, 423/658.2; 222/1, 3; 239/398, 418, 310, 239/314; 137/14; 366/341; 429/512–516; 210/753, 754, 192, 198.1
See application file for complete search history.

(56) References Cited

U.S. PATENT DOCUMENTS

| | | | | |
|---|---|---|---|---|
| 2,423,702 | A | 7/1947 | Hart, C. | |
| 2,663,626 | A | 12/1953 | Spangler | |
| 4,302,224 | A | 11/1981 | McCombs et al. | |
| 5,110,328 | A | 5/1992 | Yokota et al. | |
| 5,110,422 | A | 5/1992 | Alperine et al. | |
| 5,485,675 | A | 1/1996 | Jones et al. | |
| 5,518,528 | A * | 5/1996 | Tom et al. | 95/103 |
| 5,614,459 | A | 3/1997 | Mondragon et al. | |
| 5,704,965 | A | 1/1998 | Tom et al. | |
| 5,704,967 | A | 1/1998 | Tom et al. | |
| 5,707,424 | A | 1/1998 | Tom et al. | |
| 5,761,910 | A | 6/1998 | Tom et al. | |
| 5,837,027 | A | 11/1998 | Olander et al. | |
| 5,851,270 | A | 12/1998 | Olander | |

(Continued)

FOREIGN PATENT DOCUMENTS

EP 1 064 996 A1 1/2001

(Continued)

*Primary Examiner* — Frank Lawrence, Jr.
(74) *Attorney, Agent, or Firm* — Hultquist, PLLC; Steven J. Hultquist; Rosa Yaghmour

(57) ABSTRACT

Fluid storage and dispensing systems, and processes for supplying fluids for use thereof. Various arrangements of fluid storage and dispensing systems are described, involving permutations of the physical sorbent-containing fluid storage and dispensing vessels and internal regulator-equipped fluid storage and dispensing vessels. The systems and processes are applicable to a wide variety of end-use applications, including storage and dispensing of hazardous fluids with enhanced safety. In a specific end-use application, reagent gas is dispensed to a semiconductor manufacturing facility from a large-scale, fixedly positioned fluid storage and dispensing vessel containing physical sorbent holding gas at subatmospheric pressure, with such vessel being refillable from a safe gas source of refill gas, as disclosed herein.

22 Claims, 3 Drawing Sheets

U.S. PATENT DOCUMENTS

| | | | |
|---|---|---|---|
| 5,858,067 A | 1/1999 | McManus | |
| 5,876,487 A | 3/1999 | Dahlgren et al. | |
| 5,882,384 A | 3/1999 | Tom et al. | |
| 5,916,245 A | 6/1999 | Tom et al. | |
| 5,917,140 A | 6/1999 | Tom | |
| 5,935,305 A | 8/1999 | Tom et al. | |
| 5,961,697 A | 10/1999 | McManus et al. | |
| 5,980,608 A | 11/1999 | Dietz et al. | |
| 5,985,008 A | 11/1999 | Tom | |
| 5,993,766 A | 11/1999 | Tom et al. | |
| 6,019,823 A | 2/2000 | Tischler et al. | |
| 6,027,547 A | 2/2000 | Tom | |
| 6,089,027 A | 7/2000 | Wang et al. | |
| 6,101,816 A | 8/2000 | Wang et al. | |
| 6,110,257 A | 8/2000 | Tom | |
| 6,125,131 A | 9/2000 | Brandes et al. | |
| 6,132,492 A | 10/2000 | Hultquist et al. | |
| 6,204,180 B1 | 3/2001 | Tom et al. | |
| 6,309,446 B1 | 10/2001 | Nakanoya et al. | |
| 6,406,519 B1 | 6/2002 | Tom et al. | |
| 6,540,819 B2 | 4/2003 | Tom et al. | |
| 6,592,653 B2 | 7/2003 | Wang et al. | |
| 6,620,225 B2 | 9/2003 | Wang et al. | |
| 6,660,063 B2 | 12/2003 | Tom et al. | |
| 6,716,271 B1 | 4/2004 | Arno et al. | |
| 6,743,278 B1 | 6/2004 | Carruthers | |
| 6,764,755 B2 | 7/2004 | Tom et al. | |
| 6,868,869 B2 * | 3/2005 | Olander | 137/888 |
| 6,896,203 B1 * | 5/2005 | Restive | 239/302 |
| 6,911,065 B2 * | 6/2005 | Watanabe et al. | 95/90 |
| 6,939,394 B2 | 9/2005 | Carruthers | |
| 6,962,268 B2 * | 11/2005 | Bruat et al. | 222/3 |
| 6,991,671 B2 | 1/2006 | Brestovansky et al. | |
| 6,997,347 B2 * | 2/2006 | Peng et al. | 222/3 |
| 7,494,530 B2 | 2/2009 | Carruthers | |
| 7,951,225 B2 | 5/2011 | Olander et al. | |
| 2002/0194989 A1 | 12/2002 | Tuma et al. | |
| 2004/0206237 A1 * | 10/2004 | Sherer | 95/90 |
| 2005/0014643 A1 | 1/2005 | Lini et al. | |
| 2007/0031325 A1 | 2/2007 | Carruthers et al. | |
| 2008/0302246 A1 | 12/2008 | Carruthers et al. | |
| 2009/0188392 A1 | 7/2009 | Carruthers | |
| 2011/0048063 A1 | 3/2011 | Carruthers et al. | |

FOREIGN PATENT DOCUMENTS

| | | | |
|---|---|---|---|
| JP | 60-150831 | A | 8/1985 |
| JP | 11082891 | A | 3/1999 |
| JP | 2004-261739 | A | 9/2004 |
| WO | 2005037421 | A2 | 4/2005 |
| WO | 2007090104 | A2 | 8/2007 |
| WO | 2007136887 | A2 | 11/2007 |

* cited by examiner

FLUID STORAGE AND DISPENSING SYSTEMS, AND FLUID SUPPLY PROCESSES COMPRISING SAME

CROSS-REFERENCE TO RELATED APPLICATIONS

This application is a continuation under 35 U.S.C. §120 of U.S. patent application Ser. No. 11/913,553, filed Feb. 1, 2008, issued May 31, 2011 as U.S. Pat. No. 7,951,225, which is a U.S. National Stage of International Application No. PCT/US06/017149, filed May 3, 2006, which in turn claims the benefit of priority of U.S. Provisional Application No. 60/677,381 for "FLUID STORAGE AND DISPENSING SYSTEMS, AND FLUID SUPPLY PROCESSES COMPRISING SAME" filed May 3, 2005 in the names of Karl W. Olander, James V. McManus and Steven J. Hultquist. The disclosures of said U.S. patent application Ser. No. 11/913,553, International Application No. PCT/US06/017149 and U.S. Provisional Application No. 60/677,381 are hereby incorporated herein by reference in their respective entireties, for all purposes.

FIELD OF THE INVENTION

The present invention relates to fluid storage and dispensing systems, and processes for supplying fluids, e.g., to industrial process facilities such as semiconductor manufacturing plants, water treatment plants, natural gas storage depots, etc.

DESCRIPTION OF THE RELATED ART

In the use of packaged gases, conventional practice in many industrial applications has been to utilize high-pressure cylinders for storage, transport and dispensing of a wide variety of gases. In these applications, gas is contained in the cylinder in a compressed state, to maximize the inventory of the gas available for dispensing and ultimate use.

Since pressure of such compressed gases typically greatly exceeds atmospheric pressure, safety issues are inherent in the use of such packages, since any leakage from a high-pressure container will quickly spread to the surrounding environment of the container. Where the gas is hazardous, e.g., toxic, pyrophoric, or otherwise detrimental to health or safety of persons exposed to same, or deleterious to the environment or operability of facilities in the vicinity of the container, the risks associated with the gas-containment package are correspondingly increased. These risks constitute a major focus of gas management efforts to ensure safety in the utilization of such high-pressure gas packages, e.g., by provision of segregated tank farm facilities, underground vaults for pressurized gas supply vessels coupled in feed relationship with above-ground gas consuming facilities, etc.

In view of the safety and reliability issues involving packages of high-pressure gases in the semiconductor industry, efforts have been made in recent years to significantly increase the safety of gas packaging. This effort has produced sorbent-based fluid storage and delivery systems, such as those described in Tom et al. U.S. Pat. No. 5,518,528, in which gas is adsorbed and stored on a physical adsorbent in a fluid storage and dispensing vessel and is desorbed from the adsorbent and discharged from the vessel under dispensing conditions. In these systems, the gas can be stored and dispensed at sub-atmospheric pressure levels, typically below about 700 torr. Physical adsorbent-based systems of such type are commercially available from ATMI, Inc. (Danbury, Conn., USA) under the trademarks SDS and SAGE.

More recently, an enhanced safety fluid storage and dispensing system has been developed, in which fluid is contained in a vessel having a fluid pressure regulator disposed in its interior volume (wherein the regulator is referred to as an "internal regulator"). Such arrangement is effective to permit fluid to be stored at high pressures, with the regulator being operative to discharge fluid from the vessel only when it sees a downstream pressure that is below the set point of the regulator. Such internally disposed regulator systems are more fully described in Wang et al. U.S. Pat. Nos. 6,101,816 and 6,089,027, and are commercially available from ATMI, Inc. (Danbury, Conn., USA) under the trademark VAC.

The art continues to pursue the development of safer gas packaging, to provide safe, effective and reliable sources of gas for industrial gas-utilizing processes. This is particularly true in the semiconductor manufacturing industry, where reagent gases may be extremely toxic and even lethal at low concentrations, in some instances at concentrations as low as parts-per-million or even parts-per-billion.

SUMMARY OF THE INVENTION

The present invention relates to fluid storage and dispensing systems, and processes for supplying fluids for use thereof.

In one aspect, the invention relates to a processing installation, comprising a large-scale, fixedly positioned fluid storage and dispensing vessel containing therein a physical sorbent medium having sorptive affinity for a fluid of interest, and/or a fluid pressure regulator, and a process facility adapted to utilize such fluid of interest in a processing operation, wherein the fluid storage and dispensing vessel is coupled in dispensing flow communication with the process facility.

In another aspect, the invention relates to a gas supply system, comprising a large-scale, fixedly positioned fluid storage and dispensing vessel containing a physical sorbent medium having sorptive affinity for a fluid of interest, and a process facility adapted to utilize such fluid of interest in a processing operation, wherein the fluid storage and dispensing vessel is coupled in dispensing flow communication with the process facility, and a plurality of fluid supply vessels adapted for coupling in fluid communication with the fluid storage and dispensing vessel, to refill the fluid storage and dispensing vessel with the fluid of interest.

In a further aspect, the invention relates to a processing installation, comprising a large scale, fixedly positioned fluid storage and dispensing vessel containing a physical sorbent medium having sorptive affinity for a fluid of interest useful in manufacture of optical windows, with such fluid of interest sorptively retained on said sorbent medium at subatmospheric pressure, and a process facility for manufacturing optical windows, wherein the fluid storage and dispensing vessel is coupled in dispensing flow communication with the process facility, to flow such fluid of interest thereto.

A further aspect of the invention relates to a processing installation, comprising a gas production facility and a gas use facility, wherein the gas production facility produces a reagent gas used in such gas use facility, wherein the gas production facility and the gas use facility are coupled in fluid flow communication for passage of the reagent gas to the gas use facility, and a large-scale, fixedly positioned fluid storage and dispensing vessel containing physical sorbent medium having sorptive affinity for such reagent gas, wherein such fluid storage and dispensing vessel is interposed between the gas production facility and the gas use facility to receive reagent gas from the gas production facility and to dispense reagent gas to the gas use facility, whereby the fluid storage and dispensing vessel provides buffering of reagent gas flows from the gas production facility and to the gas use facility.

A still further aspect of the invention relates to a method of reducing ventilation gas requirements, in a process facility utilizing packaged gas, wherein the packaged reagent gas is disposed in a ventilated environment, such method comprising providing the packaged reagent gas in a large-scale, fixedly positioned fluid storage and dispensing vessel containing physical sorbent having sorptive affinity for the reagent gas, wherein the fluid storage and dispensing vessel is adapted for dispensing reagent gas to the process facility, and the vessel contains reagent gas at subatmospheric pressure.

Another aspect of the invention relates to a method of reducing pressure rating requirements for packaged reagent gas in a process facility utilizing same, such method comprising providing the packaged reagent gas in a large-scale, fixedly positioned fluid storage and dispensing vessel containing physical sorbent having sorptive affinity for the reagent gas, such vessel containing reagent gas at subatmospheric pressure.

Yet another aspect of the invention relates to a fluid storage and dispensing package, comprising a fluid storage and dispensing vessel containing (i) a physical sorbent medium having sorptive affinity for a fluid of interest, and/or (ii) an internal regulator, with a dispensing assembly coupled in fluid communication with the vessel and adapted for dispensing a fluid therefrom, and a motive fluid driver adapted for coupling with the dispensing assembly to extract fluid from the fluid storage and dispensing vessel.

In a further aspect, the invention relates to a fluid storage and dispensing package, comprising a fluid storage and dispensing vessel containing (i) a physical sorbent medium having sorptive affinity for a fluid of interest, and/or (ii) an internal regulator, with a dispensing assembly coupled in fluid communication with the vessel and adapted for dispensing a fluid therefrom, a venturi adapted for coupling in fluid communication with the dispensing assembly, and a motive fluid driver adapted for driving carrier gas through the venturi, to extract fluid from the fluid storage and dispensing vessel.

An additional aspect of the invention relates to a processing facility, comprising a manufacturing plant producing hazardous fluid intermediates, and a fluid storage and dispensing vessel coupled in hazardous fluid intermediates-receiving relationship to said manufacturing plant, wherein the hazardous fluid intermediates are contained in the vessel at subatmospheric pressure.

Another aspect of the invention relates to a processing facility, comprising a process system, potentially susceptible to emergency release of hazardous gas, and a large-scale, fixedly positioned fluid storage and dispensing vessel, arranged in emergency release hazardous gas-receiving relationship to the process system, wherein the large-scale, fixedly positioned fluid storage and dispensing vessel contains a physical sorbent having sorptive affinity for the hazardous gas.

One more aspect of the invention relates to a fluid storage and dispensing package, including a first vessel with an interior volume containing a physical sorbent medium adapted for sorptively retaining fluid thereon and for desorbing fluid under dispensing conditions, and a dispensing assembly coupled with the first vessel and arranged to selectively dispensed fluid therefrom, a second vessel with an interior volume adapted to contain a supply volume of said fluid, and a fluid pressure regulator disposed in the interior volume of the second vessel and arranged to confine the supply volume of such fluid therein, the second vessel being coupled in fluid flow supply relationship with the first vessel, and the fluid pressure regulator being arranged to mediate fluid flow from the second vessel to the first vessel to at least partially compensate for fluid dispensed from the first vessel, to thereby maintain an inventory of the fluid in the first vessel for dispensing.

In another aspect, the invention relates to a fluid supply system, comprising a fluid storage and dispensing vessel adapted for dispensing a fluid therefrom, and a helper feed unit, coupled in fluid flow communication with the fluid storage and dispensing vessel, and adapted to continuously bleed fluid into the fluid storage and dispensing vessel to maintain inventory of fluid in the fluid storage and dispensing vessel.

A still further aspect of the invention relates to a large-scale fluid storage and dispensing vessel containing therein a physical sorbent medium having sorptive affinity for fluid of interest, said vessel being adapted to be fixedly positioned at a location and/or coupled to a facility.

Another aspect of the invention relates to a method of treating liquid to improve a predetermined character thereof, including contacting the liquid with a treatment fluid to impart improvement of the predetermined character thereto, wherein said treatment fluid is supplied from a fluid source including a fluid vessel containing physical sorbent and/or a fluid pressure regulator.

In a further aspect, the invention relates to a method of fumigating a location to improve a predetermined character thereof, including introducing to the location a fumigating gas supplied from a fluid source including a fluid vessel containing physical sorbent and/or a fluid pressure regulator.

Yet another aspect of the invention relates to a small-scale fluid storage and dispensing system, comprising a fluid storage and dispensing vessel containing physical sorbent and/or a fluid pressure regulator in an interior volume thereof, and a venturi fluid extractor coupled with the vessel for withdrawal of fluid therefrom.

Another aspect of the invention relates to a wastewater treatment system, including a fluid storage and dispensing vessel containing physical sorbent and/or a fluid pressure regulator in an interior volume thereof, said interior volume also containing a wastewater treatment fluid reagent, and a venturi fluid extractor coupled with the vessel for withdrawal of the wastewater treatment fluid reagent therefrom and dispensing of a wastewater treatment fluid reagent for contacting with wastewater.

A further aspect of the invention relates to a heating gas supply system, including a fluid storage and dispensing vessel containing physical sorbent and/or a fluid pressure regulator in an interior volume thereof, said interior volume also containing a heating fluid, and a venturi fluid extractor coupled with the vessel for withdrawal of the heating fluid therefrom.

An additional aspect of the invention relates to a fumigation system, including a fluid storage and dispensing vessel containing physical sorbent and/or a fluid pressure regulator in an interior volume thereof, said interior volume also containing fumigating fluid, and a venturi fluid extractor coupled with vessel for withdrawal of the fumigating fluid therefrom.

A still further aspect of the invention relates to a fluid storage and dispensing package, including a first vessel containing physical sorbent, and a second vessel containing a fluid pressure regulator, and a fluid discharge structure coupled to the first vessel to discharge fluid therefrom, the first vessel and second vessel being coupled with one another to allow flow of fluid from the second vessel to the first vessel.

Another aspect of the invention relates to a fixed or mobile system for bulk storage and dispensing of energy storage media, e.g. gaseous fluids such as methane, hydrogen, natural gas, or other fluids or fluid mixtures from which energy can be extracted, such as by combustion, expansion, chemical reaction, etc. The system comprises a fluid storage and dispensing vessel containing (i) a physical sorbent medium having sorptive affinity for a fluid of interest, and/or (ii) an internal regulator, with a dispensing assembly coupled in fluid communication with the vessel and adapted for dispensing fluid therefrom, and a motive fluid driver adapted for coupling with the dispensing assembly to extract fluid from the fluid storage and dispensing vessel.

Another aspect of the invention relates to a fixed or mobile system for bulk storage and dispensing of refrigeration fluids, i.e. gaseous fluids such as ammonia or other fluids with a high latent heat capacity that are suitable for use in the manufacture or in refrigerant refill of conventional or adsorption refrigerators. The system comprises a fluid storage and dispensing vessel containing (i) a physical sorbent medium having sorptive affinity for a fluid of interest, and/or (ii) an internal regulator, with a dispensing assembly coupled in fluid communication with the vessel and adapted for dispensing fluid therefrom, and a motive fluid driver adapted for coupling with the dispensing assembly to extract fluid from the fluid storage and dispensing vessel.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
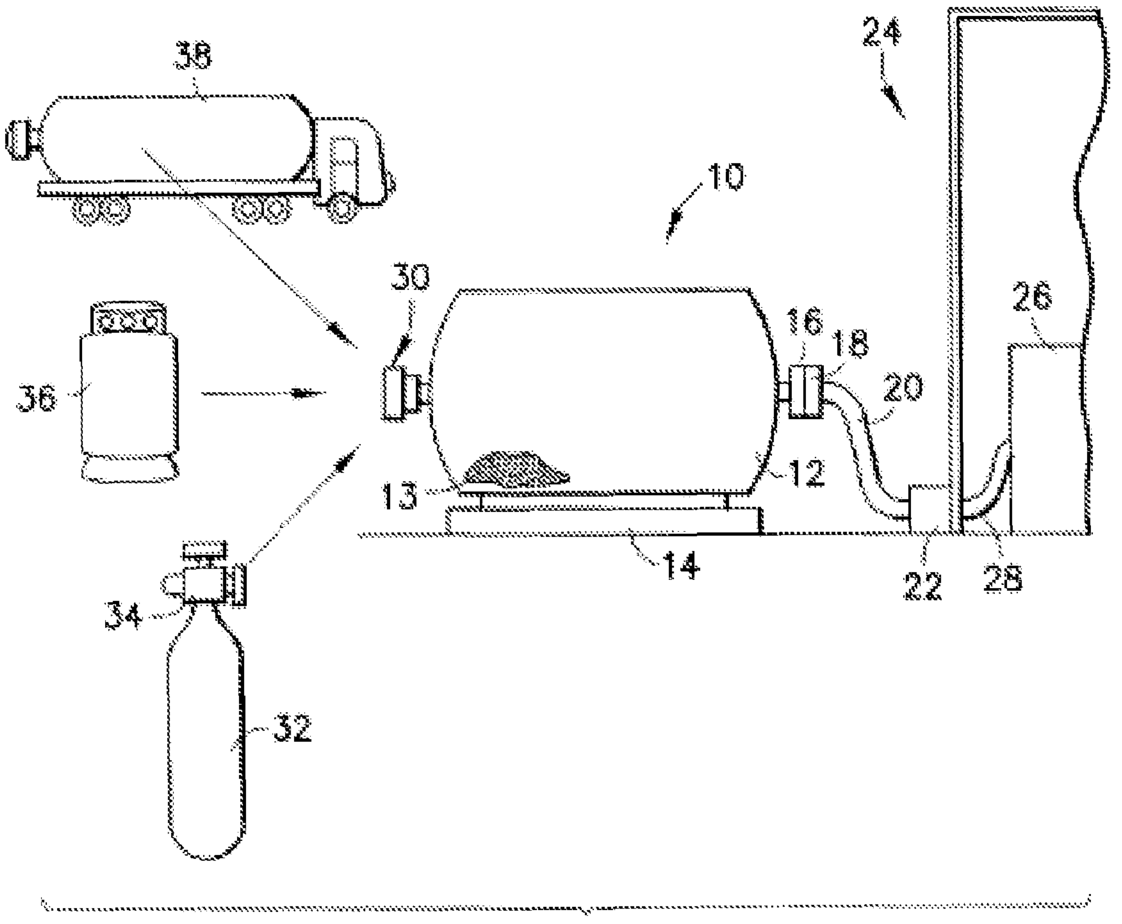
FIG. 1 is a schematic representation of a stationary sorbent vessel installation providing reagent gas to a process facility, and varied modes of refilling such vessel with reagent gas.

The present invention relates to fluid storage and dispensing systems, and processes for supplying fluids for use thereof.

The invention in one aspect relates to large-scale storage of gases for compound semiconductor manufacturing. Such large-scale storage is desirable due to the economies of scale involved, but is subject to the constraint that such large-scale storage facilities must be fixedly positioned, as a practical matter, due to the fact that the logistics of moving large cylinders are problematic.

By way of example, a 184 L volume gas storage tank of the type commercially available from Advanced Technology Materials, Inc. (Danbury, Conn., USA) under the trademark SAGE, containing a physical adsorbent medium sorptively holding gas such as arsine or phosphine at subatmospheric pressure, can weigh more than 700 pounds, and a 450 L gas storage tank of the same type can weigh more than 1200 pounds. These gas storage tanks, as a result of their size and weight, are difficult to load and unload at the fill station, and at the site of use are difficult to install and remove from gas cabinetry.

The present invention resolves such difficulties, and provides an approach for achieving large-volume on-site storage of subatmospheric pressure gases, without the necessity of shipping very large, very bulky containers over extended distances between the fill station and the site of use.

As used herein, the term "large-scale" in reference to fluid storage and dispensing vessels of the invention, means a vessel having an internal volume greater than 450 L. Correspondingly, the term "small-scale" in reference to fluid storage and dispensing vessels of the invention, means a vessel having an internal volume that does not exceed 450 L. For example, a tank having a volume of 450 L or larger can be installed in a manufacturing site, either inside or outside the manufacturing facility.

It will be recognized that the present invention has applicability to large-scale as well as small-scale vessels, and includes fixed and stationary vessels of both large-scale and small-scale types. In some instances, large volume vessels are transported, such as those on tube trailers and vessels mounted on railroad cars.

More specifically, the term "stationary" or "fixedly positioned" in reference to fluid storage and dispensing vessels denotes a vessel that is substantially permanent in location, e.g., a vessel mounted on a permanent footing or foundation in the earth, or otherwise anchored permanently to a floor, wall, building or other structural entity.

As used herein, the term "physical sorbent" refers to a material having a sorptive affinity for fluid, physically associating with the fluid in a reversible manner. The physical sorbent may be solid, semi-solid or non-solid in character, e.g., a liquid, pseudoplastic material, thixotropic material, rheopectic material, gel, or multiphase material. Preferred physical sorbent materials include solid physical adsorbents, such as silica, alumina, molecular sieves, clays, macroreticulate polymers, carbon (including so-called activated carbons), and the like.

The invention in one aspect relates to a gas storage and dispensing system including a stationary vessel for sub-atmospheric storage of gas, e.g., hazardous gas. Although utilized in further embodiments of sub-atmospheric storage of gas, the present invention is broadly applicable to storage and dispensing of material at low super atmospheric pressure, or at moderate pressure, utilizing an adsorbent and/or a mechanical regulator within the vessel. For example, the economic character of a specific application may warrant storage of fluid material at 300 or 400 psi on a physical adsorbent bed in order to maximize the storage capacity of the vessel for such contained material.

The vessel can be of any suitable type, including high-pressure designs, as well as low-pressure designs. For example, the vessel can be rated for pressures up to 2500 pounds per square inch gauge (psig) or even higher, or alternatively, the vessel can be a low pressure design, e.g., having a burst pressure of less than 300 psig, consistent with current U.S. Department of Transportation (DOT) exemption specifications. Such storage vessel can be fitted with thermowell fittings and/or active/passive heating structures, such as fins, jackets, coils, and other means of inputting energy useful in desorbing the adsorbed gas. Inasmuch as such vessel is stationary, the vessel is not subject to DOT regulations.

Fluid-containing vessels in the broad practice in the present invention may be of any suitable size and configuration. Where the vessel contains physical sorbent, and it is of a very large volume, such as 2000 L or more, there may be some flow impedance associated with a large volume of sorbent material, and it may be desirable to have multiple discharge ports or take-offs for dispensing the gas from the vessel, e.g., in a manifold arrangement including feed conduits joining the multiple discharge ports or take-offs with a header or other manifold structure.

Alternatively, such impedance may be minimized by the provision of multiple discrete beds or masses of the physical sorbent within the vessel, physically separated from one another, by a separation medium such as a mesh, packing or open three-dimensional matrix structure, permitting fluid desorbed from the sorbent to pass into plenum areas of the vessel, for egress of the fluid during dispensing operation.

By such fixedly positioned installation, the gas storage tank is able to be constructed and arranged without the constraints applicable to vessels that are transported on roads and highways, and which therefore must be designed to accommodate the possibility of a traffic accident involving the vehicle that is transporting the vessel.

As a result of the stationary installation of the large-scale gas vessel containing physical sorbent on which the gas is sorptively retained, larger quantities of hazardous materials can be accommodated at the use site than would be the case if conventional high-pressure vessels were employed. The physical sorbent-based vessels are capable of holding gas at subatmospheric pressures and therefore the physical sorbent-based vessels represent orders of magnitude less risk than the high-pressure systems. As a result, the physical sorbent-based vessels are exempt from compressed gas classifications.

In the operation of the large-scale gas vessel containing physical sorbent on which gas is sorptively retained, the vessel is advantageously connected to an extractor system, e.g., a pumper unit that serves to apply suction or other extractive pressure differential to the physical sorbent bed in the vessel, to thereby effect desorption, and dispensing of gas from the vessel. The extractor unit can be located near a process tool and transfer hazardous gas from the physical sorbent-based vessel to the process tool. The extractor system may alternatively, or additionally, provide heating or other energy input to the physical sorbent in the vessel, to thermally effect desorption of the sorbent fluid, for dispensing thereof. The extractor system may also include other thermal control technologies that can either provide heat to the adsorbent, or remove heat from the adsorbent, to compensate for 1) cooling due to high flow rate desorption (i.e., release) of fluid from the adsorbent or 2) heating due to high flow rate adsorption (i.e., loading) of fluid on the adsorbent, respectively.

Periodically the stationary physical sorbent-containing vessel is replenished using a portable gas supply vessel, such as a regulator-equipped liquid storage and gas dispensing vessel of a type commercialized by ATMI, Inc. (Danbury, Conn., USA) under the trademark VAC, dispensing gas at appropriate pressure, e.g., a pressure of 650 torr. The use of a regulator-equipped liquid storage and gas dispensing vessel supplying gas at subatmospheric pressure ensures that a safe low-pressure level can be maintained on site.

The frequency of the refill operation, in which gas is dispensed from the regulator-equipped liquid storage and gas dispensing vessel to the stationary physical sorbent-containing vessel, is a function of the storage capacity of the stationary vessel and the rate at which gas is used therefrom. For example, a 650 torr regulator-equipped liquid storage and gas dispensing vessel can be used to transfer gas to the stationary physical sorbent-containing vessel to provide a final pressure in the stationary physical sorbent-containing vessel of 650 torr. The regulator-equipped liquid storage and gas dispensing vessel can be located adjacent to the stationary physical sorbent-containing vessel.

The foregoing arrangement of the stationary physical sorbent-containing vessel and a regulator-equipped liquid storage and gas dispensing vessel, affords a highly efficient arrangement of gas supply and gas replenishment vessels that can be employed to minimize the number of gas dispensing vessels that are required to be brought into, stored in, installed and removed from, the industrial process facility, e.g., a semiconductor manufacturing plant. This mode of operation facilitates a business arrangement in which a gas company owns the stationary physical sorbent-containing vessel as well as the regulator-equipped liquid storage and gas dispensing vessel, and is responsible for scheduling refills of the stationary vessel from a regulator-equipped liquid storage and gas dispensing vessel.

The stationary physical sorbent-containing vessel can be configured in any suitable manner. For example, the vessel may employ a sub-atmospheric pressure regulator in the discharge line of the vessel, and/or in the interior of the vessel, so that ambient gas, e.g., air, is prevented from in-leaking to the interior volume of the vessel and contaminating the physical sorbent material therein. A regulator thus may be deployed to prevent contamination of the sorbent medium by in-leaking gases, with the regulator being set at a suitable sub-atmospheric pressure, e.g., a value in a range of 300-400 torr.

The gas storage and dispensing system described above provides a substantial reduction in the level of risk associated with supply of gases to industrial process facilities such as semiconductor manufacturing plants. More specifically, such system provides subatmospheric pressure storage of gas, with refilling of the stationary physical sorbent-containing vessel being carried out at subatmospheric pressure, with high-pressure gas on site only a small portion of the time, during the replenishment operation for the stationary vessel.

Gases in this arrangement are used/stored at subatmospheric pressure and represent a reduction in risk>1000 times relative to conventional high pressure gas supply vessels. In addition, the gas storage and dispensing system of the invention results in savings of large amounts in respect of installation and maintenance of ventilation systems, emergency gas release systems, and the like, as well as realizing economies in equipment placement and minimizing or even eliminating system components such as double-wall piping.

Systems of these configurations that utilize super-atmospheric low pressure storage can also afford significant advantages in terms of the associated risks compared to compressed or liquefied gas storage vessels, and can also afford significantly reduced system expenses in terms of reduced complexity compressors needed to refill the storage vessels.

The foregoing gas storage and dispensing system also affords related to cost savings and efficiencies in terms of the risk management activities of the industrial process facility utilizing such system. Insurance costs can be substantially reduced as a result of the reduced risk associated with the industrial process facility, and preparation and implementation of the risk management plan (RMP) for such process facility is simplified. The magnitude of a catastrophic event is substantially reduced by the use of the gas storage and dispensing system of the invention. Further, process economy is improved by supplying gas from a larger vessel, i.e., the large stationary physical sorbent-containing vessel, as compared to use of many small size high-pressure gas cylinders.

The above-described gas storage and dispensing system is highly scalable, and is adaptable to storage and dispensing of many types of gases, for many types of end-use applications and process facilities. The system is highly advantageous in reducing the number of gas supply vessels that are required for operation of the process facility, and thereby achieves a superior level of efficiency in relation to prior practice involving high-pressure gas cylinders.

In a specific embodiment of the above-described as storage and dispensing system, hydrogen selenide is stored in the stationary sorbent-containing vessel, and dispensed to a zinc selenide chemical vapor deposition (CVD) manufacturing process for infrared transmitting windows. The hydrogen selenide may be produced on site and in such circumstance, it is advantageous to collect the hydrogen selenide is produced, and to feed it to the sorbent-containing vessel, for storage therein, for dispensing on-demand, at sub-atmospheric pressure. In a commercial installation, the sorbent-containing vessel may for example have a volume on the order of about 450 L, providing a full day's requirement of hydrogen selenide. If 3-4 tonner vessels holding physical sorbent were employed, several days of inventory of hydrogen selenide would be accommodated. In such production facility environment, several sorbent-containing vessels could be loaded, while an additional, on-stream vessel is being used for active dispensing of hydrogen selenide. In this manner, multiple sorbent-containing vessels could be manifolded or otherwise interconnected, to provide for a continuity of operation, in collection and subsequent dispensing of hydrogen selenide.

As a further embodiment, sorbent-containing vessels could be operated in dynamic equilibrium, in which collected hydrogen selenide gas is being introduced at one end of the vessel, while hydrogen selenide is withdrawn from the other end of such vessel. Such double-ended operation cancels out heat of adsorption effects.

In another embodiment, a similar arrangement is employed for storage of hydrogen sulfide in a stationary sorbent-containing vessel, for dispensing to a zinc sulfide CVD process for manufacture of zinc sulfide optical windows.

In yet another embodiment, a large-scale sorbent-containing vessel is deployed in a gas production and use facility, situated between the gas production plant and the facility or location where the gas is consumed. In such arrangement, the sorbent-containing vessel is utilized as a sub-atmospheric pressure buffer vessel. To further enhance safety, such sorbent-containing vessel can be coupled via suitable flow circuitry including valve and piping components, to an emergency release scrubber (ERS) unit. The ERS unit can be relatively small in size, and is designed to handle overflow from the sub-atmospheric pressure buffer vessel in the event of a fire or similar emergency situation. This arrangement obviates the need and capital cost of installing a larger ERS unit, and operation and maintenance costs are correspondingly substantially reduced, in relation to the provision of a stand-alone ERS unit.

Due to the low-pressure character of the large-scale sorbent-containing vessel, ventilation requirements in the vicinity of the vessel are substantially reduced, relative to a corresponding high-pressure gas storage and dispensing vessel. This is due to the fact that the ventilation flow rates must be very high to ensure safety in the use of high-pressure gas storage and dispensing vessels, since any release or leakage of the highly pressurized gas will require a correspondingly high volumetric flow rate of ventilation gas to "sweep away" the released gas, to minimize its concentration in the ambient environment of the leak or release.

As a further benefit in relation to the use of high-pressure gas storage and dispensing vessels, the gas storage and dispensing vessel, containing sorbent to sorptively retain gas at low superatmospheric pressure, is able to be constructed with substantially thinner walls due to the low-pressure environment that is maintained within the vessel. In consequence, the vessel need only be rated for modest working pressures, e.g., as low as 200 or 300 psig in some instances, thereby rendering the vessel substantially cheaper to produce than a thicker walled, higher pressure-rated vessel used for containment of high-pressure gas. Further, as a result of the lower pressure rating, the sorbent-containing gas storage and dispensing vessel may be favored by less rigorous environmental and building code requirements.

FIG. 1 is a schematic representation of a stationary sorbent vessel installation providing reagent gas to a process facility, and varied modes of refilling such vessel with reagent gas.

The stationary sorbent vessel installation 10 includes a fixedly positioned vessel 12 containing a bed 13 of physical sorbent material therein, in which the physical sorbent has sorptive affinity for the gas to be stored in and dispensed from the vessel. The vessel 12 is mounted on a base 14, such as a concrete or steel understructure that is on or anchored to the ground outside a process facility 24, such as a semiconductor manufacturing plant containing a process tool 26 that uses gas dispensed from the vessel 12.

As illustrated, the vessel 12 has a discharge port 16 that is coupled by coupling 18 to a discharge conduit 20. The discharge conduit 20 has a motive fluid driver 22 coupled thereto, to effect flow of the dispensed fluid from the vessel 12 into the feed line 28 to the tool 26. The motive fluid driver can be of any suitable type, and can for example include an extractor unit including a vacuum pump, surge tank, and associated fluid flow circuitry and monitoring and control equipment, to withdraw fluid from the vessel 12 at a predetermined or otherwise desired flow rate for flow to the tool or other fluid-utilizing apparatus or process in the process facility 24.

The vessel 12 has a refill port 30 to which may be coupled a refill gas source, such as an sorbent-containing resupply vessel 32 equipped with a dispensing assembly 34 that is joined by suitable flow circuitry (schematically indicated in FIG. 1 by the arrow to the refill port 30 of the vessel 12). For such purpose, the sorbent-containing resupply vessel 32 may be connected with suitable extraction equipment, such as an extractor unit, to assist the transfer of fluid from the resupply vessel 32 to the stationary vessel 12. The resupply vessel thus has an inventory of gas therein that is dispensed into the stationary vessel 12, to provide an inventory of gas therein that is sorptively retained on the bed 13 of sorbent material, from which the gas is desorbed under fluid dispensing conditions that are effected by action of the motive fluid driver 22.

The motive fluid driver 22 can be of any suitable type, and may alternatively be constituted by compressors, pumps, ejectors, eductors, venturis, fans, blowers, cryopumps, etc., e.g., in combination with mass flow controllers, restricted flow orifice or other flow controlling devices, together with piping, conduits, flow passages, surge or hold-up tanks, sensors, detectors, and/or monitoring and control elements, etc., as necessary or desired in a given end use application of the stationary physical sorbent-containing vessel.

The refill gas source that is coupled to refill port 30 for refilling of the vessel 12 may additionally, or alternatively, include an internal regulator-equipped fluid supply vessel 36, containing the fluid to be refilled into vessel 12. The fluid can be contained in the internal regulator-equipped fluid supply vessel 36 in a compressed gas or in a liquid form, under suitable pressure, confined in the interior volume of the vessel by a regulator with a set point that is set to dispense the fluid to the vessel 12 during the refill operation at suitable pressure. For example, the set point pressure of the regulator in refill vessel 36 can be a suitable subatmospheric pressure, to maximize the safety of the refilling operation.

As a still further alternative, the refill gas source that is coupled to the refill port 30 for refilling of the vessel 12 can be a tube trailer vehicle 38, carrying refill fluid in a tank on the trailer, and provided with a dispensing assembly that is coupled to the vessel refill port 30 by suitable hoses, lines, piping, etc. to effect transfer of the refill fluid from the tube trailer tank to the vessel 12.

Another aspect of the present invention relates to storage and dispensing of fumigant gas, in particular, phosphine gas.

Currently, metal phosphides are widely used to release fumigant gases for use in protecting grains and other natural products from insect and rodent attack.

One approach in contemporary application involves the provision of aluminum phosphide as a fumigant source reagent. Water or atmospheric moisture hydrolyzes this material to release phosphine gas. Tablets of aluminum phosphide are placed in air recirculation dispensers or otherwise are placed in a suitable area to release phosphine gas at an appropriately slow rate. Aluminum phosphide (AlP) is inexpensive, but temperature and humidity are major determinants of the release rate, and these parameters are highly variable, and thus uncertain as activating conditions for release of the fumigant gas. In addition, controlling concentration as well as the timing of the fumigant gas delivery is very difficult, insofar as achieving reliability and reproducibility is concerned.

Given the foregoing problems, it would be preferable to deliver neat phosphine gas on demand at a specific concentration and rate that are congruent with the end-use application. Despite such preference, there are two major issues confronting the use of a phosphine gas per se. Phosphine is a highly flammable gas and a very toxic gas. The flammability problem can be avoided by formulating the phosphine gas with a diluent gas, e.g., as a 2% mixture of phosphine in carbon dioxide. At such low concentration, the gas is not flammable on contact with air, but the highly diluted mixture entails shipment of large quantities of gas to provide the desired amount of phosphine.

The issue of phosphine toxicity is a safety issue from the standpoint of the shipping phosphine gas, which also involves a potential terrorist threat factor.

The foregoing issues incident to the use of phosphine gas are addressed in the practice of the present invention by packaging phosphine gas in an adsorbed state, so that it is sorptively bound at low-pressure, e.g., subatmospheric pressure, or alternatively, by packaging phosphine gas in a regulator-equipped gas storage and dispensing vessel, wherein the regulator is disposed in the interior volume of the vessel, with the set point of the regulator being at a subatmospheric pressure, so that phosphine gas is only dispensed when the regulator sees an external environment pressure that is at or below the set point pressure value for the regulator.

The foregoing packaging approaches enable the use of neat phosphine gas in a highly safe and efficient manner.

Typical concentrations of phosphine gas for fumigation applications are in the range of 2-1000 ppm. In consequence, very small withdrawal rates are required relative to other gas dispensing applications. The direct use of neat gas packaged in accordance with the present invention provides a highly efficient arrangement for dispensing exact quantities of phosphine gas on demand. Additionally, the packaging of phosphine gas at 100% concentration is markedly less costly than the formulation and shipment of extremely dilute gas mixtures of phosphine gas, particularly where transportation of the dilute phosphine gas mixture involves long shipping distances and different shipping means or methods.

Accordingly, the invention achieves a marked advance in the art, in the provision of phosphine gas as packaged in an adsorbed state on a physical sorbent medium at subatmospheric pressure, or in a regulator-equipped gas storage and dispensing vessel having the regulator interiorly disposed within the vessel gas space, with the regulator arranged to confine the phosphine gas at high-pressure, and the regulator having a set point in a low pressure regime, thereby avoiding hazardous inadvertent or accidental discharge of phosphine gas at superatmospheric pressure.

Since the invention facilitates the packaging of phosphine gas at 100% concentration, thereby achieving economy over shipment of extremely dilute phosphine gas mixtures, the invention facilitates mixing of the phosphine gas with a diluent or a carrier gas at the point of use. Accordingly, the phosphine gas package of the invention advantageously includes a metering dispensing assembly coupled to a carrier gas mixer, for formulating the fumigant gas at such point of use, so that the phosphine gas is withdrawn from the gas package and mixed/diluted and delivered on demand.

When the subatmospheric pressure dispensing packages of the invention are employed to supply phosphine gas, an external vacuum condition is desired to provide a motive force to remove the gas from the package. Such external vacuum condition can be provided by any of a wide variety of motive fluid drivers, including for example vacuum pumps, blowers, compressors, venturis, fans, suction devices, ejectors, eductors, cryopumps, and the like.

For example, one gas extraction device suitable for withdrawal of gas from the package at subatmospheric pressure includes a venturi generator to create a vacuum, with an orifice or other mass flow device arranged to control the rate of withdrawal of phosphine gas from the phosphine-containing gas package.

When a venturi is employed to effect withdrawal of the fluid from the gas package, and/or fluid mixing, the carrier fluid can be of any suitable type appropriate to the specific end-use application of the invention. For example, the carrier fluid can be a gaseous or vapor carrier medium, a liquid carrier medium, a multi-phase fluid carrier medium, or any other suitable fluid medium having utility for the desired withdrawal and/or mixing operation.

In an illustrative embodiment, phosphine gas is packaged in an internal regulator-equipped vessel confining phosphine gas at suitable superatmospheric pressure, with the regulator having a set point for dispensing that is below 1 atm pressure, e.g., 650 torr.

Once an external pressure (outside the package) below 650 torr is exposed to the regulator, e.g., by coupling the package to dispensing circuitry that is evacuated by vacuum pump or other gas extractor, the regulator within the vessel will open to permit flow at that set point pressure to occur. In a particularly preferred arrangement, the gas extractor includes a venturi that is powered by the carrier gas, so that the phosphine gas mixes with the carrier gas at the venturi and is diluted to the desired concentration. For this purpose, the venturi may be associated with metering equipment, to insure that there is a constant ratio between the carrier gas flow rate and the phosphine gas flow rate.

Mixing of the carrier gas and phosphine gas to form a fumigant gas mixture for administration to a locus of use requiring fumigant treatment, can be carried out with a mixer, such as a static mixer, and such static mixer can be incorporated in a mixing section of a venturi device.

The drive gas for the venturi can be produced using a small compressor. The compressor additionally can employ a membrane or other device, e.g., a pressure swing adsorption (PSA) unit, to reduce the oxygen content in the drive gas if flammability is an issue. Alternatively, the drive gas can be an inert gas such as nitrogen or carbon dioxide.

In a preferred mode of operation, the low level of fumigant gas (e.g., low pressure and low flow rates) relative to the drive gas powering the venturi, is such that dilution to nonflammable mixtures occurs so quickly that combustion or explosions cannot occur. Reducing the oxygen content of the drive gas or using an inert gas such as nitrogen also will minimize or eliminate that threat.

In one preferred embodiment, the invention comprises a delivery system including an internal regulator-equipped vessel containing phosphine gas, a venturi vacuum generator system, a drive gas source of air or other gas, which may for example include a small compressor and surge tank, and appropriate restrictive flow orifices to limit gas flow from the internal regulator-equipped vessel.

The phosphine gas storage and dispensing system can be equipped with various monitoring and control devices such as sensors and detectors, and coupled to controllers such as CPUs, microprocessors, programmable logic units, general-purpose programmable computers, or the like. The system can be operated at various drive gas delivery pressures to control fumigant concentration. Additionally, the system can be set to operate on a time dispense mode dosing schedule, intermittently or in a step-wise mode, where concentrations are varied over time, utilizing a suitable cycle time controller. The system can be electric or battery powered, or powered in some other manner.

In one embodiment, the phosphine gas storage and dispensing system includes a gasoline-powered compressor, with the system being mounted on a trailer, cart, truck bed or other motive or vehicular structure, as a mobile system.

In a particularly a preferred embodiment, the phosphine gas storage and dispensing system includes a drive gas/venturi arrangement that is operative to actuate the regulator inside the phosphine gas storage and dispensing vessel, to initiate dispensing of phosphine gas, to dilute the phosphine gas to a useful concentration, and to convey the resulting phosphine gas mixture to the point of use.

The phosphine gas storage and dispensing system of the invention achieves a substantial advance in the art, in the enablement of effective use of neat phosphine gas as a fumigant medium.

Use environments in which the phosphine gas storage and dispensing system of the invention may be deployed, include grain elevators, ships, barns and other transport and storage venues, as well as residential and office buildings. The phosphine gas storage and dispensing system provides a compact and mobile apparatus for fumigation applications.

In embodiments in which the phosphine gas storage and dispensing system of the invention includes a vessel containing physical sorbent medium sorptively retaining phosphine gas thereon, the system desirably includes a mass flow controller (MFC) to maintain a predetermined delivery rate of phosphine gas as internal pressure in the vessel changes, with increasing exhaustion of the inventory of phosphine gas from the vessel.

In another aspect of the invention, chlorine ($Cl_2$) is packaged in a fluid storage and dispensing package, including either a vessel containing physical sorbent medium having sorptively affinity for chlorine, or alternatively a vessel having a fluid pressure regulator interiorly disposed in the vessel to confine the fluid at high-pressure, with a regulator set point enabling chlorine gas to be dispensed at low pressure, e.g., subatmospheric pressure.

Chlorine gas and chlorine liquid are toxic and corrosive in character, and pose numerous hazards in use. These hazards are of sufficient magnitude that many municipalities that formerly used chlorine as a sterilant for public water supplies have switched to alternative sterilants, such as sodium hypochlorite, for water purification. Sodium hypochlorite (NaOCl) is more expensive and less effective than chlorine and is not stable. Sodium hypochlorite is typically shipped as a 15% aqueous solution.

The chlorine gas storage and dispensing system of the invention permits continued use of chlorine gas in a safe and effective manner. Such continuity of use enables the user to minimize operating expenses relative to the use of more costly alternatives, as well as avoiding the necessity to use other less effective sterilants.

In one embodiment, chlorine gas is packaged in a fluid storage and dispensing vessel containing an interiorly disposed pressure regulator, whereby the chlorine gas can be stored at high-pressure, and be protected from discharge by the regulator, which has a regulator set point pressure of suitably low value, so that dispensing of chlorine cannot take place, unless the regulator is exposed to an external pressure that is at or below the set point. Packaging of chlorine in such regulator-equipped storage and dispensing vessel achieves a substantial reduction, e.g., greater than 1000 times, of the risks of accidental release of phosphine gas.

The chlorine storage and dispensing system of the invention is advantageously employed with a venturi device and a mixing station, to treat waste water or drinking water by drawing $Cl_2$ to the mixing station where it is dispersed into water for treatment thereof. Correspondingly, systems can be utilized for storage and delivery of sulfur dioxide gas ($SO_2$) for the same applications.

In one embodiment of the chlorine storage and dispensing system of the invention, a tonner vessel or tube trailer, provided with an interiorly disposed fluid pressure regulator, is arranged for sub-atmospheric pressure delivery of chlorine, e.g., at pressure of 500-700 torr. Such large-scale supply container then is connected to a water-driven pump or venturi that will activate the internal regulator and permit flow of chlorine for dispensing thereof, with a simple orifice or MFC device being disposed in the dispensing flow circuitry to control the volume of delivered gas. Such arrangement is highly scalable in character, and amenable to implementation using widely varying sizes of the chlorine storage and dispensing vessel.

Figure 2:
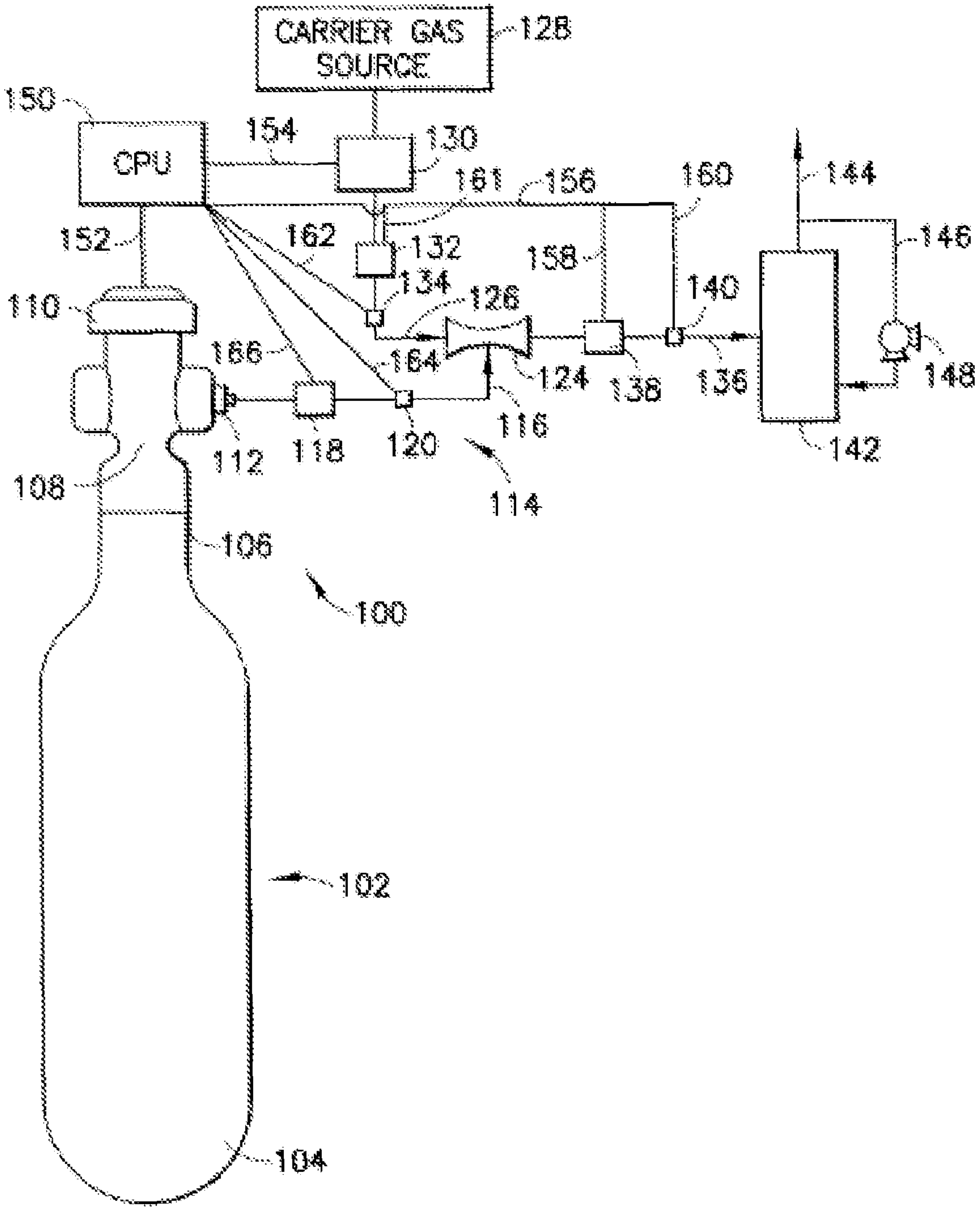
FIG. 2 is a schematic representation of a system for supplying gas such as phosphine gas for fumigant applications or chlorine gas for water disinfection applications.

FIG. 2 is a schematic representation of a system 100 for supplying gas such as phosphine gas for fumigant applications or chlorine gas for water disinfection applications. The system 100 includes a fluid storage and dispensing package 102, which can include an sorbent-containing vessel having gas sorptively retained on a physical sorbent therein, and/or an internal regulator-equipped vessel containing a fluid at pressure that is confined by an internal regulator having a fixed or adjustable set point that is accommodated to the dispensing operation. For example, the regulator in the fluid storage and dispensing package may be set to a sub-atmospheric pressure, so that gas is not dispensed from the vessel unless the regulator is exposed to an external pressure that is equal to or below the sub-atmospheric set point pressure.

The fluid storage and dispensing package 102 includes a cylindrical vessel 104 of vertical upstanding orientation, holding the fluid therein for dispensing, and coupled at its neck portion with a valve head dispensing assembly 108 containing a valve therein that is actuated by the manual hand wheel 110, or otherwise by an automatic valve actuator coupled to the valve in the valve head. The valve head dispensing assembly 108 has a fluid dispensing port 112 that is joined to a fluid dispensing line 116 containing therein a dispensed fluid flow controller 118, which can for example include a mass flow controller, restricted flow orifice, flow control valve, or other flow control devices, as well as a dispensed fluid monitor 120, which can include a sensor, detector, gas analyzer assembly or other device or apparatus for monitoring the dispensed fluid.

The fluid dispensing line 116 is coupled with the throat of a venturi 124, for extracting the fluid from the fluid storage and dispensing package 102 for entrainment and mixing with the carrier gas from carrier gas source 128.

The carrier gas source 128 can be of any suitable type. For example, the carrier gas can be ambient air or air that is filtered or purified for flow to the venturi, or the carrier gas may be provided in a source vessel or other supply apparatus. The carrier gas from carrier gas source 128 is flowed in carrier gas feed line 126 to the venturi 116, and the resulting gas mixture of carrier gas and fluid from the fluid storage and dispensing package 102 is flowed out of the venturi in discharge line 136 to the end use location 142, which can be any appropriate locus or facility in which the gas mixture stream from the venturi is usefully applied, e.g., for disinfection of water with chlorine gas, or fumigation of foodstuffs in a food storage installation such as a warehousing facility, grain silo, brewery, food processing plant, etc.

The introduced gas at such location 142 can be discharged from the location in discharge line 144, and/or recycled in recirculation loop 146 containing pump 148 or other suitable motive fluid driver therein, to ensure appropriate gas change rate or throughput of gas at the location 142.

The carrier gas feed line 126 may have any suitable process components therein, or coupled thereto, such as a motive fluid driver 130, a flow controller 132, a carrier gas monitor 134, and/or any other elements or sub-systems that assist in the feed of the carrier gas medium to the venturi. The motive fluid driver 130 can include a pump, compressor, blower, fan, or other driver. The flow controller can include a restricted flow orifice, flow control valve, or other control device or assembly. The monitor 134 can be of any suitable type, e.g., a flow rate sensor, a gas analyzer, a pressure transducer, etc.

In like manner, the discharge line 136 from the venturi can contain or be coupled to any similar motive fluid driver, flow control and monitoring components, e.g., a motive fluid driver and flow control assembly 138 and a monitoring element 140.

The gas supply system 100 of FIG. 2 can include an automatic control system, e.g., a central processing unit (CPU) 150 as shown, which is linked in signal transmission relationship to various system components by respective signal transmission lines, including line 152 to valve actuator 110 (which in such case would be an automatically controllable actuator), line 154 to motive fluid driver 130, line 161 to flow controller 132, line 162 to carrier gas monitor 134, line 166 to dispensed fluid flow controller 118, line 164 to dispensed fluid monitor 120, line 158 to motive fluid driver and flow control assembly 138 and line 160 to monitoring element 140, with lines 158, 160 and 161 being joined in turn to the signal transmission line 156.

The signal transmission lines may be used to transmit monitoring signals indicative of monitored process conditions or parameters to the CPU 150 from appropriate components, and for transmitting control signals to controlled components of the system. The CPU 150 can be of any appropriate type, e.g., a microprocessor, microcontroller, programmable logic unit, programmable general purpose computer, or other appropriate apparatus including hardware/software suitable for the monitoring and control of the system. The CPU 150 may be programmably arranged to actuate the system for dispensing of gas from package 102 at predetermined intervals, according to a cycle timer program, or at times that are determined by monitoring or conditions obtaining in the location 142.

While the foregoing discussion of gas storage and dispensing systems of the type shown in and described with respect to FIG. 2 have been directed to storage and dispensing of phosphine and chlorine, as illustrative gas species, it will be appreciated that the applicability of such systems is not thus limited, but extends to a wide variety of alternative gases that are transported and/or used in diluted form. Examples include gaseous or vapor phase herbicides, pesticides, anesthesia gases, fire suppression gases, sampled gases for determination of terror threat, quality assurance, analysis, etc.

As a further specific example, the gas storage and dispensing vessel may contain nitrous oxide for dispensing and injection to an internal combustion engine system of a vehicle, to optimize the performance of the vehicle. Additional applications of this approach include natural gas, propane and hydrogen vehicle fuels, either in internal combustion or fuel-cell electrical vehicles. The ambient air, pouring over a moving vehicle, or being pulled into the intake manifold of such a vehicle, or taken into an internal combustion cylinder, can provide a convenient carrier gas flow for venturi extraction of gas from an sorbent-containing vessel or an internal regulator-containing vessel. Ambient air velocity in such applications can be increased, using passive means such as wind scoops, or active means such as turbocharging.

The chlorine gas dispensing system of the invention may be practiced in one embodiment for dispensing of chlorine gas at pressures of 500-600 torr for treatment of water in residential or municipal swimming pools, as an alternative to use of sodium hypochlorite. Other sterilization or disinfection applications may be carried out using bromine or chloramines as the sterilant or disinfection gas, as dispensed from an sorbent-containing vessel or a regulator-equipped gas storage and dispensing vessel.

In a further embodiment, the internal regulator-equipped gas storage and dispensing vessel may be configured as a railway tank car, in which fluid is contained at high pressure, confined by the regulator, and available for dispensing at substantially lower pressure than the containment pressure at which the gas is stored in the tank car.

Additional applications involving the dispensing of a dilute active ingredient include dispensing phosphine as a fungicide for grain or tobacco products, e.g., as a mixture containing 2% phosphine in carbon dioxide. The internal regulator-equipped gas storage and dispensing vessel may also be employed for dispensing of a therapeutic agent in a venturi-supplied carrier gas such as air or oxygen, to an inhalation circuit linked to a patient.

A further application involving delivery of a dilute gas mixture including a fuel gas, relates to the use of the propane or other fuel gas, dispensed from a regulator-equipped storage and dispensing vessel, or alternatively, from an sorbent-containing vessel, for use in portable gas grills, for cooking purposes. In such application, the gas supply vessel would be accessorized with a small-scale compressor as a pumping component coupled to the gas supply vessel with suitable tubing, conduit or other flow circuitry. Natural gas or butane may alternatively be used as the gas medium, in place of propane in such application.

As yet another gas dispensing operation that may be practiced using an sorbent-containing vessel or a regulator-equipped vessel in accordance with the invention, chlorine dioxide ($ClO_2$) may be dispensed, using a small-scale compressor or other motive fluid driver, and a dispensing assembly with associated flow circuitry, for termite extermination applications, or alternatively for treatment of anthrax-contaminated sites or sites that are potentially contaminated with anthrax, as a result of terrorist activity or industrial accident.

In applications in which an sorbent-containing vessel or a regulator-equipped vessel are employed in accordance with the invention, in combination with a motive fluid driver and associated flow circuitry, the motive fluid driver and associated flow circuitry may be fabricated in an integral manner with respect to the vessel, to provide a unitary package for gas storage and dispensing. Alternatively, the vessel, motive fluid driver and associated flow circuitry may be provided as components of a kit, for assembly by a user at the point of use. The vessel in such kit may be provided in an empty state, for subsequent charging with fluid, or alternatively, the vessel may be pre-loaded with fluid for fluid dispensing upon the assembly of the kit components.

In instances in which an sorbent-containing vessel is employed for storage and dispensing of gas, the desorption of the stored gas from the physical sorbent medium may be effected, or assisted, by thermally-mediated desorption, as previously discussed herein. For such purpose, a wide variety of heating means and methods may be employed, including, without limitation, electrical resistance heating of the vessel and/or physical sorbent, conductive heating, use of enhanced heat transfer elements such as fins, bars or other extended surface area elements, impingement of radiation, such as microwave or infrared radiation, on the vessel and/or physical sorbent therein, and/or use of high thermal conductivity media in the bed of the physical sorbent material, to assist heating of the bed, by solid heat transfer therein. As another heating modality, waste heat from a process facility may be employed to heat the vessel and/or physical sorbent therein.

The invention also contemplates construction and configuration of the adsorbent bed to facilitate the transport of heat into and out of the adsorbent, using interdigitated high thermal conductivity heat transfer plates, or incorporation of metallic or other materials into the adsorbent material to create an adsorbent matrix with improved macroscopic thermal conductivity, or other combinations of these approaches. Heat transport in or out of the adsorbent may be required to realize high flow rate transport of the adsorbed species out of or onto the adsorbent. For example, for bulk gaseous fuel storage and dispensing of fluids such as methane or natural gas, it will be desirable to fill the adsorbent-containing vessel at a high rate, and the resulting exothermic adsorption process will need to be mitigated by efficient removal of that heat.

The invention also contemplates the use of large-scale sorbent-containing vessels, which are refilled with gas from other large-scale sorbent-containing vessels, with all vessels being fixedly positioned and stationary. Large-scale sorbent-containing vessels may also be used to store hazardous intermediates in a process facility, such as in a pharmaceutical manufacturing plant, fine chemical manufacturing plant, or hazardous gas manufacturing plant.

In another aspect, the invention relates to the use of large-size stationery gas storage and dispensing vessels containing physical sorbent medium sorptively retaining gas at low, e.g., subatmospheric, pressure conditions, coupled in dispensing relationship to a process facility such as a semiconductor manufacturing plant. In such arrangement, the physical sorbent-based gas storage and dispensing system provides gas storage conditions that reduce risk many orders of magnitude in relation to use of high pressure cylinders.

By such arrangement, a large stationary tank containing sorbent medium is utilized to store large amounts of gas for the process facility. The tank is fixedly positioned and is not returned to a fill station or gas plant for recharging. Instead, a refill assembly including a tube trailer, tonner or large cylinder is employed to periodically refill the stationary unit. By this arrangement, the bulk of the gas on-site at any time is held safely at low, e.g., subatmospheric pressure.

In one preferred embodiment of such arrangement, a pump system is employed to withdraw the adsorbed gas, by imposition of desorption conditions, and deliver the withdrawn gas to the process facility. The pump system can be operated to deliver gas at a suitable pressure, such as for example a slightly positive pressure, as needed. The downstream portion of the delivery system can advantageously include an extraction assembly, such as may include a motive fluid driver and associated flow circuitry.

The stationary physical sorbent-based supply tank permits large amounts of hazardous fluid material to be safely and economically stored in inventory at a use site. Refill is accomplished quickly and efficiently using an interiorly disposed regulator-containing vessel holding a volume of fluid, with its regulator being set for low-pressure, e.g., subatmospheric pressure refilling of the stationary tank.

The approach of on-site use of refillable sub-atmospheric pressure tanks has the potential for widespread adoption due to heightened concerns related to potential terrorist threats. Gas companies that produce hazardous gases such as arsine or phosphine can employ this approach, for storing gases on-site until containers are ready to be filled for transport to the customer location. This approach can be applied to many types of gases and is highly advantageous in the circumstance in which the gas company is located in a populated area, as a safer storage tank for hazardous gases.

As another implementation of the inventive approach of using sorbent-containing vessels, large sorbent containing vessels can be utilized, optionally with prechilling of the sorbent and the tank to accommodate heat of adsorption, for passive emergency response situations. This arrangement eliminates the need for compressors or pumps that could constitute an ignition source in the event of a flammable gas release. The tank could be used to adsorb gas from a leaking container by withdrawing liquid from the leaking container, vaporizing it and then adsorbing it. The vaporizer in such arrangement could be integral to the adsorption tank, such that the heat of vaporization is offset by the heat of adsorption. The integral vaporizer could then be used to assist in removing heat from the sorbent, since this could be utilized as a method to add heat in the system.

Another aspect of the invention relates to a fluid storage and dispensing package, including a first vessel with an interior volume containing a physical sorbent medium adapted for sorptively retaining fluid thereon and for desorbing fluid under dispensing conditions, and a dispensing assembly coupled with the first vessel and arranged to selectively dispensed fluid therefrom. The fluid storage and dispensing package further includes a second vessel with an interior volume adapted to contain a supply volume of the aforementioned fluid, and a fluid pressure regulator disposed in the interior volume of the second vessel and arranged to confine the supply volume of such fluid therein, e.g., at superatmospheric pressure. The second vessel is coupled in fluid flow supply relationship with the first vessel, and the fluid pressure regulator is arranged to mediate fluid flow from the second vessel to the first vessel to at least partially compensate for fluid dispensed from the first vessel, and maintain an inventory of the fluid in the first vessel for dispensing.

Although the art has proposed use of a single vessel containing an internally disposed regulator and sorbent medium, commercially available from ATMI, Inc. (Danbury, Conn., USA) under the trademark VACSorb, such single vessel construction is fundamentally different from the approach of the present invention to utilize a fluid storage and dispensing package including sub-assembly vessels coupled to one another through a valve head or other fluid flow interface, in which the internal regulator-equipped vessel is a supply vessel to the additional vessel containing physical sorbent medium for sorptively holding the gas for dispensing, and wherein the internal pressure regulator in the regulator-equipped vessel is set at a pressure set point that keeps the physical sorbent medium in the sorbent-containing vessel loaded, preferably maximally loaded, with gas, so there is (1) increased capacity and service life of the sorbent-containing vessel, related to a single sorbent-containing vessel (not coupled with a regulator-equipped refilling vessel), and (2) maintenance of safety as a consequence of the low pressure level at which the gas is sorptively retained in the vessel containing sorbent medium, and the safety afforded by the regulator protection of the fluid in the regulator-equipped refilling vessel.

In one preferred arrangement, the fluid storage and dispensing package includes the sorbent-containing vessel and the regulator-equipped refilling vessel in vertically aligned, opposedly facing relationship to one another, as hereinafter more fully described.

The sorbent-containing vessel may for example be quite large in relation to the regulator-equipped refilling vessel, although any relative size (and relative fluid volume) ratio appropriate to the specific end use application can be employed. The "conjoint vessel" arrangement may employ any suitable headering or interconnection structure, by which the vessels are coupled in fluid communication with one another when the regulator in the regulator-equipped refilling vessel is open to permit flow of fluid from the interior volume of the regulator-equipped refilling vessel into the interior volume of the sorbent-containing vessel.

By way of specific example, the regulator-equipped refilling vessel may contain arsine at sufficiently high superatmospheric pressure to maintain the arsine in a liquid state in such vessel. The fluid pressure regulator in the interior volume of such vessel may be set at a set point pressure of 700 torr, meaning that the fluid pressure regulator will not open unless the regulator sees an exterior pressure from the sorbent-containing vessel that is equal to or below the set point pressure of 700 torr. The sorbent-containing vessel may contain an activated carbon sorbent material that has a substantial sorptive affinity for arsine gas, and from which arsine gas is desorbable under dispensing conditions. The dispensing assembly that is joined to the sorbent-containing vessel can for example include a valve head with a valve actuator such as a manually actuatable hand wheel, coupled to a valve stem that in turn is joined to a valve element that is translatable in the valve head between fully closed and fully opened positions.

The dispensing assembly of the sorbent-containing vessel in this fluid storage and dispensing package can be adapted for coupling with flow circuitry arranged to flow dispensed fluid to a downstream end-use facility, such as an ion implantation semiconductor manufacturing tool operating at vacuum pressure, when the valve in the valve head is opened. The downstream vacuum pressure will then serve to cause desorption of the fluid from the physical sorbent and flow from the sorbent-containing vessel into the flow circuitry coupled thereto.

As the dispensing operation proceeds, the arsine gas desorbs from the physical sorbent, and is discharged from the sorbent-containing vessel, thereby lowering the loading of arsine on the physical sorbent and the inventory of gas in such sorbent-containing vessel that is available for subsequent dispensing. However, when the sorbent-containing vessel is dispensing arsine, the downstream vacuum pressure is communicated through the sorbent-containing vessel to the fluid pressure regulator of the regulator-equipped refilling vessel, and, being lower than the set point pressure of the regulator, such external vacuum pressure causes the regulator to open, thereby effecting flow of arsine vapor, deriving from the arsine liquid in the regulator-equipped refilling vessel, into the sorbent-containing vessel, wherein the refilling arsine is adsorbed on the physical sorbent in the sorbent-containing vessel to "reload" the physical sorbent with adsorbed arsine, to maximize the inventory of arsine in the sorbent-containing vessel for subsequent dispensing operation.

Even if the flow control valve in the valve head of the sorbent-containing vessel is closed to terminate the flow of arsine gas through the flow circuitry to the downstream ion implantation facility, if the pressure in the sorbent-containing vessel remains below the set point of the fluid pressure regulator of the regulator-equipped refilling vessel, then arsine vapor will continue to flow from the regulator-equipped refilling vessel to the sorbent-containing vessel, until the pressure of the sorbent-containing vessel rises to above the set point pressure of the fluid pressure regulator.

In this manner, the regulator-equipped refilling vessel functions to maintain an inventory of arsine gas in the sorbent-containing vessel for dispensing.

The conjoint vessel arrangement described above could be implemented in a unitary shell or housing containing the respective sorbent-containing vessel and regulator-equipped refilling vessel; additionally, partitioning of a single vessel into a sub-unit sorbent-containing portion and a sub-unit regulator-equipped refilling portion could be advantageously employed.

An additional advantage of this conjoint vessel arrangement is weight; the sorbent-containing vessel can be thinner in wall dimension and of lower weight, relative to the regulator-equipped refilling vessel, while providing a high capacity system for extended gas dispensing service life.

By this arrangement, the regulator in the regulator-equipped refilling vessel is set at a set point pressure that will maintain the physical sorbent in the sorbent-containing vessel maximally loaded with sorbate fluid, so that dispensing of fluid from the sorbent-containing vessel and reduction in fluid inventory will result in opening of the regulator to flow additional fluid into the sorbent-containing vessel to reload the sorbent medium with additional fluid. In this manner, for example, a very large gas inventory can be supplied from a source liquid in a relatively small regulator-equipped refilling vessel, without the problem of "heels" that would otherwise accompany the latter stage of dispensing of a normal load of gas from an sorbent-containing vessel.

Figure 3:
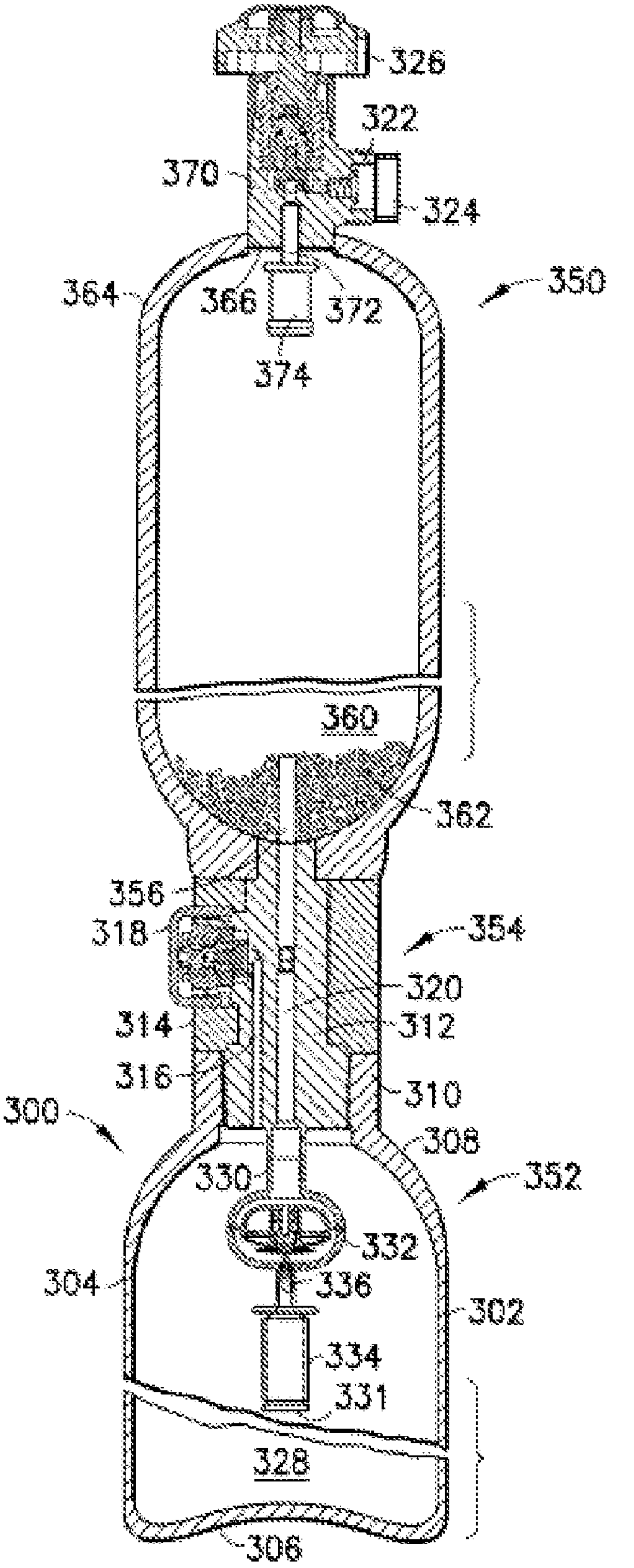
FIG. 3 is a schematic representation of a gas supply package including an internal regulator-equipped refilling vessel, arranged in fluid refilling relationship with a physical sorbent-containing vessel to which a dispensing assembly is coupled.

FIG. 3 is a schematic representation of a gas supply package 300 including an internal regulator-equipped refilling vessel 352, arranged in fluid refilling relationship with a physical sorbent-containing vessel 350 to which a dispensing assembly is coupled.

The gas supply package 300 includes the internal regulator-equipped refilling vessel 352, which is depicted in cross-sectional elevational view according to an illustrative embodiment of the present invention. The internal regulator-equipped refilling vessel 352 includes a fluid storage and dispensing vessel 302 of generally cylindrical form, with cylindrical side wall 304 closed at its lower end by floor member 306. At the upper end of the vessel is a neck 308 including a cylindrical collar 310 defining and circumscribing a top opening of the vessel. The vessel wall, floor member and neck thereby enclose an interior volume 328 as shown.

At the neck of the vessel 352, a threaded plug 312 of the inter-vessel coupling assembly 314 is threadably engaged with the interior threaded opening of the collar 310. The inter-vessel coupling assembly 314 includes a central fluid flow passage 320 joined in fluid flow communication with a refilling tube 356 communicating at its open upper end with the interior volume 360 of the upper sorbent-containing vessel 350, described hereinafter in greater detail.

The inter-vessel coupling assembly 314 includes a vent flow passage 316 joined to an over-pressure relief valve 318 and communicating with the interior volume 328 of the vessel 352, for relief of gross over-pressure conditions in the vessel. Such over-pressure relief assembly may also be modified so that passage 316 also serves as a fill passage for initial charging of the vessel 352 with refill fluid, and after such charging functions as the vent passage.

The central fluid flow passage 320 in the inter-vessel coupling assembly 314 is joined at its lower end to a connector flow tube 330, to which in turn is joined the regulator 332. The regulator is set to maintain a selected pressure of the fluid discharged from the vessel 352. At the lower end of the regulator is joined a tubular fitting 336 which in turn is joined, e.g., by butt welding, to a diffuser unit 334 having a diffuser end cap 331 at its lower extremity. The diffuser unit may be formed of stainless steel, with the diffuser wall being formed of a sintered stainless steel such as 316L stainless steel. The diffuser unit has a wall porosity that permits removal of all particles greater than a predetermined diameter, e.g., greater than 0.003 micrometers at 30 standard liters per minute flow rate of gas from the system. Filter diffuser units of such type are commercially available from Millipore Corporation (Bedford, Mass.) under the trademark WAFERGARD.

The upper physical sorbent-containing vessel 350, although shown in broken vertical section, is of elongate cylindrical form, bounded by the vessel wall 364 enclosing an interior volume 360 of the vessel, and contains a bed 362 of physical sorbent medium therein. The physical sorbent has a sorptive affinity for the fluid that is stored in and transferred to the vessel 350 during refill operation, and may for example comprise activated carbon sorbent, molecular sieve, alumina, silica, macroreticulate polymer, or any other suitable physical sorbent material on which the fluid of interest can be adsorbed in an appropriate loading for dispensing to the end use location. Alternatively, the physical sorbent, instead of being provided as a bed of particles or other discontinuous form of the material, can be provided in a monolithic or bulk form, e.g., of bricks, boules, blocks or other bulk form.

The wall 364 of the sorbent-containing vessel 350 has a port 366 at its upper end, threaded complementarily to matably engage a valve head assembly 370. The valve head assembly 370 includes a valve element 322 in a central working volume cavity of the assembly, with the valve element 322 being joined to a hand wheel 326 in the embodiment shown, but which may alternatively be joined to an automatic valve actuator or other controller or actuating means.

The central working volume cavity of the valve head assembly is in turn joined to outlet 324, which may be exteriorly threaded or otherwise constructed for attachment of a connector and associated piping, conduit, etc. thereto. The valve head assembly thus provides a dispensing assembly that can be coupled with flow circuitry or other delivery structure to deliver the dispensed gas to the downstream location of use.

The valve head assembly 370 includes a dispensed gas feed tube 372, arranged for communication with the central working volume cavity of the valve head assembly. The dispensed gas feed tube 372, at its lower end, is coupled with particulate filter 374. The particulate filter 374 may be of a same type as the diffuser unit 334 in the lower internal regulator-containing vessel, and serves to filter the gas during dispensing operation, to ensure that fines or other particulates deriving from the bed 362 of sorbent material are not carried into the valve head assembly 370, where it may compromise the operation of the valve head assembly, or otherwise be problematic in exposure to downstream componentry.

In use, a suitable fluid reagent is contained in the interior volume 328 of the vessel 302, e.g., a high pressure gas or a liquefied gas. The fluid pressure regulator 332 is set to a selected set point to provide flow of dispensed fluid when the pressure in the interior volume 360 of the upper sorbent-containing vessel falls below the set point of regulator 332. Fluid then flows through the diffuser unit 334, fitting 336, regulator 332, connector flow tube 330, and refilling tube 356 into the interior volume 360 of the upper sorbent-containing vessel.

Although the upper vessel in FIG. 3 is shown as being of a similar size in relation to the lower internal regulator-containing vessel, the relative size ratio of the two vessels may be widely varied, and the sorbent-containing upper vessel may be larger than, of similar size, or smaller than the lower regulator-containing vessel, depending on the gas inventory and dispensing requirements associated with such gas storage and dispensing package.

Although the inter-vessel coupling assembly 314 is shown as being generally coaxial with the respective upper and lower vessels in the gas storage and dispensing package, it will be appreciated that the specific structure of such coupling assembly may be widely varied in practice, and that such structure may be off-axis, laterally arranged, in a non-aligned series relationship, or arranged in any other suitable manner, to provide an interfacial structure between the internal regulator-containing vessel and the sorbent-containing vessel.

The fluid storage and dispensing package shown in FIG. 3 can be fabricated in any suitable size, to provide the volume of fluid for dispensing that is appropriate for the given end use application. In one embodiment, the package is fabricated to be of a size consistent with portability of the package, so that the package may be readily manually transported, installed and deinstalled at a point of use of the dispensed fluid. The fluid storage and dispensing package can therefore be fabricated with a height that can range from about 2 feet (0.61 meter) to about 5 feet (1.52 meters), and the package may be equipped with handles, roller wheels, or other accessory features, enabling it to be readily manually manipulated for transport, installation and deinstallation.

The fluid storage and dispensing package of the type shown in FIG. 3 can be fabricated in many different configurations, including a sorbent-containing vessel and a regulator-equipped vessel that are yoked or otherwise coupled with one another, so that the regulator-equipped vessel can dispense fluid to the sorbent-containing vessel. For example, a yoking structure may be employed, which is configured to threadably engage with threaded couplings of the sorbent-containing vessel and the regulator-equipped vessel. Additionally, the regulator-equipped vessel in another modification could contain sorbent medium, of a same or different type, in relation to the sorbent medium in the other vessel.

In another embodiment, the fluid storage and dispensing package may be fabricated as part of a motive vehicular assembly, whereby the package can be easily transported, e.g., as mounted on a high-capacity battery-powered truck, for movement about the floor of a semiconductor manufacturing plant.

In another aspect of the invention, a large fixedly positioned (stationary installation) or mobile sorbent-containing vessel is constructed with an attached small-scale "helper feed unit" that is arranged to "bleed in" the reagent gas to the large vessel, for continuously maintained high capacity dispensing of gas from the sorbent-containing vessel. The helper feed unit is advantageously an internal regulator-equipped vessel. This helper feed unit arrangement resolves the significant problem of heat of sorption effects when charging a massive bed of sorbent with a reagent gas, where the heat has to be dissipated in order to fully load the bed with gas. Additionally, the recharge operation for this system is comparatively simple, involving only a switch-out of the regulator-equipped refilling vessel, or alternatively being carried out by subjecting the regulator-equipped refilling vessel to cryogenic conditions to depress the poppet element in the regulator, where the regulator is a poppet-type device, and allow reverse filling of the regulator-equipped refilling vessel "in place." For this purpose, the regulator-equipped refilling vessel could be jacketed for coupling with a cryostat, to recharge the regulator-equipped refilling vessel in situ.

In another aspect, the invention relates to a system for bulk storage and dispensing of an energy storage medium, comprising:

a fluid storage and dispensing vessel containing (i) a physical sorbent medium having sorptive affinity for at least a portion of said fluid, and/or (ii) an internal regulator;

a dispensing assembly coupled in fluid communication with the vessel and adapted for dispensing fluid therefrom; and a motive fluid driver adapted for coupling with the dispensing assembly to extract fluid from the fluid storage and dispensing vessel.

The dispensing assembly in such system may be of any suitable type, providing a flow path for egress of discharged fluid from the vessel. In specific embodiments, the dispensing assembly may include a valve head including a flow control valve of a manual or automatic character, which is selectively adjustable between fully open and fully closed positions, to provide a desired flow of discharged fluid. The dispensing assembly in other embodiments may additionally, or alternatively, include manifolding, piping, flow control devices, mass flow controllers, regulators, sensors, monitors, fittings, connectors, etc., as may be necessary or desirable in a given implementation of the invention.

The motive fluid driver likewise may be of any suitable type, including, in specific embodiments, pumps, cryopumps, compressors, ejectors, eductors, fans, blowers, turbines, etc.

The physical sorbent medium can be of any type that has suitable sorptive affinity for at least a portion of the fluid that is to be stored in and subsequently dispensed from the vessel. As used in such context, the term "at least a portion" means a part or a whole of the volume of the fluid, and, when the fluid is a multicomponent fluid, a part thereof may be one or more, but less than all of the components, of such multicomponent fluid.

In a specific embodiment, the fluid comprises at least one of methane, hydrogen, and natural gas. More generally, the fluid can be any fluid or fluid mixture from which energy can be extracted, e.g., by combustion, expansion, chemical reaction, etc., or combinations thereof.

The system described above may in specific embodiments be of a fixedly positioned character, or alternatively, the system may be constructed arranged for motive transport, e.g., wherein the vessel is adapted for mounting on a trailer bed of a truck trailer assembly, or on a railroad flatcar, etc.

In another aspect, the events relates to a system for bulk storage and dispensing of refrigeration fluid, comprising:

a fluid storage and dispensing vessel containing (i) a physical sorbent medium having sorptive affinity for at least a portion of said fluid, and/or (ii) an internal regulator;

a dispensing assembly coupled in fluid communication with the vessel and adapted for dispensing fluid therefrom; and a motive fluid driver adapted for coupling with the dispensing assembly to extract fluid from the fluid storage and dispensing vessel.

The refrigeration fluid may comprise ammonia, a halocarbon fluid, or any other suitable fluids having appropriate latent heat capacity characteristics. As in the previously described embodiments, the refrigeration fluid storage and dispensing system may be of a fixedly positioned character, or it may alternatively be constructed and arranged for motive transport.

In the practice of the present invention, in which an internal regulator-equipped vessel is utilized, the internal regulator may be of any suitable type, e.g., a regulator having a fixed set point pressure, or alternatively, an adjustable set point regulator can be employed, in which the set point is selectively adjustable in situ in the interior volume of the vessel containing the regulator. Such in situ adjustment of the regulator set point can be effected by mechanical linkages, radiofrequency or other electromagnetic interactions, thermo-modulated interactions, etc. An adjustable set point regulator may be highly advantageous in specific applications, such as where the set point of the regulator is adjusted to be at a first predetermined pressure level during transportation and storage of the vessel, and then is adjustable at the point of use to a second predetermined pressure for active dispensing.

The internal regulator-equipped fluid storage and dispensing vessel may contain a regulator in combination with variable restrictive flow orifice devices, in which the variable restrictive flow orifice is provided upstream of the regulator to limit the flow rate, or downstream of the regulator to control the flow rate.

Further, it will be appreciated that the extraction of fluid from the fluid storage and dispensing vessel by carrier medium flow through a venturi, as described in various embodiments hereof, may be practiced with any suitable carrier medium, e.g., a non-gaseous carrier medium, a liquid carrier medium, a liquid-gas mixture, or other fluid medium, being flow through the venturi.

The packages, systems, installations and facilities of the invention include various assemblies and subassemblies as structural components, and the invention contemplates same as separate aspects of the invention, that may be separately provided in the practice of the invention, e.g., as modules or units that may be cooperatively connected, coupled, assembled or otherwise fabricated to yield the aforementioned packages, systems, installations and facilities.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A fluid supply system, comprising:

a sorbent-based and/or internal pressure regulator-equipped supply vessel holding fluid;

a dispensing assembly coupled with the fluid supply vessel, wherein the coupled fluid supply vessel and dispensing assembly are adapted to contain the fluid in the supply vessel for dispensing thereof at subatmospheric or low superatmospheric pressure from the dispensing assembly; and a mixing assembly coupled in fluid flow communication with the dispensing assembly, wherein said mixing assembly is adapted to mix dispensed fluid from the dispensing assembly with a carrier fluid in relative proportions producing a dispensed fluid/carrier fluid mixture in which the dispensed fluid is diluted to a predetermined concentration in the mixture, and to discharge the dispensed fluid/carrier fluid mixture for use, wherein the fluid contained in and dispensed from the supply vessel comprises a fluid selected from the group consisting of fumigation fluids, water treatment fluids, and fuel fluids;

wherein when the fluid contained in and dispensed from the supply vessel comprises fumigation fluid, the fumigation fluid comprises phosphine gas, the carrier fluid comprises carrier gas, and the mixing assembly is adapted to dilute the phosphine gas with carrier gas to a nonflammable concentration effective for fumigation;

wherein when the fluid contained in and dispensed from the supply vessel comprises water treatment fluid, the water treatment fluid comprises a water treatment gas selected from the group consisting of chlorine, bromine and chloramines; and wherein when the fluid contained in and dispensed from the supply vessel comprises a fuel fluid, the fuel fluid comprises a gas selected from the group consisting of propane, butane, natural gas, and hydrogen.

2. The fluid supply system of claim 1, wherein the fluid contained in and dispensed from the fluid supply vessel comprises phosphine gas, the dispensing assembly is adapted to dispense the phosphine gas at subatmospheric pressure, and the mixing assembly is adapted to dilute the phosphine gas with carrier gas to a non-flammable concentration of phosphine effective for fumigation in the dispensed phosphine gas carrier gas mixture, that is in a range of from 2 to 1000 ppm.

3. The fluid supply system of claim 2, wherein the mixing assembly is adapted to receive the carrier fluid from a source thereof, wherein the carrier fluid comprises a gas selected from the group consisting of air, nitrogen and carbon dioxide.

4. The fluid supply system of claim 1, wherein the fluid contained in and dispensed from the fluid supply vessel comprises a water treatment fluid selected from the group consisting of chlorine, bromine and chloramines.

5. The fluid supply system of claim 4, wherein the mixing assembly is adapted to receive the carrier fluid from a source thereof, wherein the carrier fluid comprises water.

6. The fluid supply system of claim 1, wherein the fluid contained in and dispensed from the fluid supply vessel comprises a fuel fluid selected from the group consisting of propane, butane, natural gas, and hydrogen.

7. The fluid supply system of claim 6, wherein the mixing assembly is adapted to receive the carrier fluid from a source thereof, wherein the carrier fluid comprises air.

8. The fluid supply system of claim 1, as comprised in a motive vehicle.

9. A fumigation system, comprising a sorbent-based and/or internal regulator-equipped supply vessel holding phosphine and coupled with a dispensing assembly, wherein the supply vessel and dispensing assembly are adapted to contain phosphine in the supply vessel for dispensing phosphine gas at subatmospheric or low superatmospheric pressure from the dispensing assembly, and a mixing assembly coupled in fluid flow communication with the dispensing assembly, wherein said mixing assembly is adapted to mix dispensed phosphine gas from the dispensing assembly with a carrier gas in relative proportions producing a phosphine/carrier gas mixture in which phosphine is diluted to non-flammable concentration in a range of from 2 ppm to 2% in the mixture, and to discharge the phosphine/carrier gas mixture for fumigation use, wherein the carrier gas is selected from the group consisting of air, carbon dioxide, and inert gas.

10. The fumigation system of claim 9, wherein the mixing assembly comprises a venturi mixer arranged for extraction of phosphine from the supply vessel through the dispensing assembly.

11. The fumigation system of claim 9, further comprising a carrier gas source arranged in supply relationship to said mixing assembly.

12. The fumigation system of claim 11, wherein the carrier gas source comprises ambient air or filtered or purified air.

13. The fumigation system of claim 11, wherein the carrier gas source comprises nitrogen or carbon dioxide.

14. The fumigation system of claim 9, wherein the supply vessel comprises a sorbent-based supply vessel.

15. The fumigation system of claim 14, wherein the sorbent-based supply vessel holds carbon physical sorbent.

16. The fumigation system of claim 9, wherein the supply vessel comprises an internal regulator-equipped supply vessel.

17. A fuel supply system, comprising a sorbent-based and/or internal regulator-equipped supply vessel holding a fuel fluid and coupled with a dispensing assembly, wherein the supply vessel and dispensing assembly are adapted to contain the fuel fluid in the supply vessel for dispensing thereof at subatmospheric or low superatmospheric pressure from the dispensing assembly, and a mixing assembly coupled in fluid flow communication with the dispensing assembly, wherein said mixing assembly is adapted to mix dispensed fuel fluid from the dispensing assembly with air in relative proportions producing a fuel fluid/air mixture, and to discharge the fuel fluid/air mixture for use.

18. The fuel supply system of claim 17, wherein the fuel fluid comprises a fluid selected from the group consisting of propane, butane, natural gas, and hydrogen.

19. The fuel supply system of claim 17, wherein the supply vessel comprises a sorbent-based supply vessel holding carbon physical sorbent.

20. The fuel supply system of claim 17, wherein the supply vessel comprises an internal regulator-equipped supply vessel.

21. A method of supplying a fluid for use, comprising storing said fluid in a sorbent-based and/or internal pressure regulator-equipped supply vessel and dispensing said fluid from the supply vessel through a dispensing assembly, wherein the supply vessel and dispensing assembly are adapted to contain the fluid in the supply vessel for dispensing thereof at subatmospheric or low superatmospheric pressure from the dispensing assembly, and mixing dispensed fluid from the dispensing assembly with a carrier fluid in relative proportions producing a dispensed fluid/carrier fluid mixture in which the dispensed fluid is diluted to a predetermined concentration in the mixture, and discharging the dispensed fluid/carrier fluid mixture for use, wherein the fluid stored in and dispensed from the supply vessel comprises a fluid selected from the group consisting of fumigation fluids, water treatment fluids, and fuel fluids, wherein when the fluid contained in and dispensed from the supply vessel comprises fumigation fluid, the fumigation fluid comprises phosphine gas, the carrier fluid comprises carrier gas, and the mixing assembly is adapted to dilute the phosphine gas with carrier gas to a nonflammable concentration effective for fumigation;

wherein when the fluid contained in and dispensed from the supply vessel comprises water treatment fluid, the water treatment fluid comprises a water treatment gas selected from the group consisting of chlorine, bromine and chloramines; and wherein when the fluid contained in and dispensed from the supply vessel comprises a fuel fluid, the fuel fluid comprises a gas selected from the group consisting of propane, butane, natural gas, and hydrogen.

22. The method of claim 21, wherein the fluid stored in and dispensed from the supply vessel comprises phosphine gas, the dispensing assembly is adapted to dispense the phosphine gas at subatmospheric pressure, and the mixing assembly is adapted to dilute the phosphine gas with carrier gas to a non-flammable concentration of phosphine effective for fumigation in the dispensed phosphine gas/carrier gas mixture, that is in a range of from 2 ppm to 2%.

* * * * *